UNITED STATES PATENT OFFICE.

CHARLES S. REEVE, OF GRANTWOOD, NEW JERSEY, ASSIGNOR TO THE BARRETT COMPANY, A CORPORATION OF NEW JERSEY.

EMULSION AND PROCESS OF MAKING THE SAME.

1,408,224.     Specification of Letters Patent.     Patented Feb. 28, 1922.

No Drawing.     Application filed July 23, 1920. Serial No. 398,391.

*To all whom it may concern:*

Be it known that I, CHARLES S. REEVE, a citizen of the United States, residing at Grantwood, in the county of Bergen and State of New Jersey, have invented certain new and useful Improvements in Emulsions and Processes of Making the Same, of which the following is a specification.

This invention relates to bituminous materials. It relates especially to bituminous materials of a liquid or semi-liquid nature which contain clay or similar material.

The object of the invention is to produce an aqueous emulsion of bituminous materials which shall be more stable than similar emulsions heretofore produced. Another object of the invention is to produce a process by which the bituminous material can be suspended in the aqueous dispers medium for a longer period than has heretofore been possible with the usual processes.

It has been known for a long time that an emulsion could be produced by mixing clay, water, and bituminous materials and stirring the same, whereupon a certain proportion of the bituminous material and the clay would become permanently suspended in the water and would not settle upon long standing. It has been found for example that when an emulsion of about 4 parts soft coal tar pitch having a melting point of 100°–110° F. (by cube in water method), 3 parts of clay and 3 parts of water were dispersed in 9 parts of water to one part of this emulsion, about 65% by volume of this mixture would remain in suspension at the end of ten minutes. Such emulsions are unsatisfactory, however, because there is a tendency for the materials to settle out upon long standing, and it is also impossible to procure the concentration of bituminous material in the emulsion that is sometimes desirable.

By the present invention a mixture of bituminous material such as asphalt, coal tar, etc., and argilliferous materials such as clay, is made to form an emulsion in water in such a manner that upon dispersion in water a larger percentage of bitumen and clay will be retained in suspension than in the old processes. In order to bring about this result, I have found that when ammonium hydroxide is added to the water the product is very much improved in the respects above mentioned.

In order to make the invention more clearly understood, the following specific example is given for illustrative purposes but it is not intended to restrict the invention to the exact proportions or materials herein mentioned. For example, an emulsion of the same materials and proportions above described may be prepared excepting for the addition of ammonium hydroxide to the amount of about 0.25% of the weight of the emulsion. Upon dispersing this emulsion in 9 parts of water to 1 part of emulsion, it has been found that about 90% by volume of the mixture would remain in suspension at the end of 10 minutes as compared with 65% when the hydroxide was omitted. The proportion of ammonium hydroxide has been varied from about 2/10 of one per cent to forty-five hundredths of one per cent or higher, but no noticeable improvement has been found by using proportions of hydroxide greatly in excess of the latter amount. The proportions of bituminous material and clay may also be varied over a wide range with satisfactory results, since in all cases the addition of the hydroxide tends to make the emulsion more permanent. Although a relatively soft pitch has been described in this specification, I have obtained similar results with harder pitches. I therefore do not desire to limit myself to soft pitch but include any residue obtained by the distillation of tar.

Another advantage of using the hydroxide as set forth in this invention is that it causes a more rapid set or hardening of the composition when it is subjected to a drying operation.

The composition or emulsion produced as above set forth can be used in its fluid or simi-fluid condition as a paint or coating and when so applied, the water dries out and the hydroxide causes the layer to harden quite rapidly. Also, the emulsions which contain no ammonia break down more quickly and readily than those which contain it. So far ammonium hydroxide has given decidedly the most satisfactory results, but sodium hydroxide or potassium hydroxide may be used to some advantage.

I claim:

1. A composition of matter comprising bituminous material, argilliferous material, water and ammonium hydroxide.

2. A composition of matter comprising pitch, argilliferous material, water and ammonium hydroxide.

3. A composition of matter comprising about 4 parts bituminous material, 3 parts clay, water, and ammonium hydroxide.

4. A composition of matter comprising a mixture of about 4 parts soft coal tar pitch, 3 parts clay, and 3 parts water, containing between 0.2% and 0.5% by weight of ammonium hydroxide.

5. The process which comprises emulsifying a mixture of bituminous material and clay in water containing ammonium hydroxide.

In testimony whereof I affix my signature.

CHARLES S. REEVE.